July 15, 1941.   O. H. WALTON   2,249,099
DIRECT CURRENT POWER SYSTEM
Filed June 20, 1940
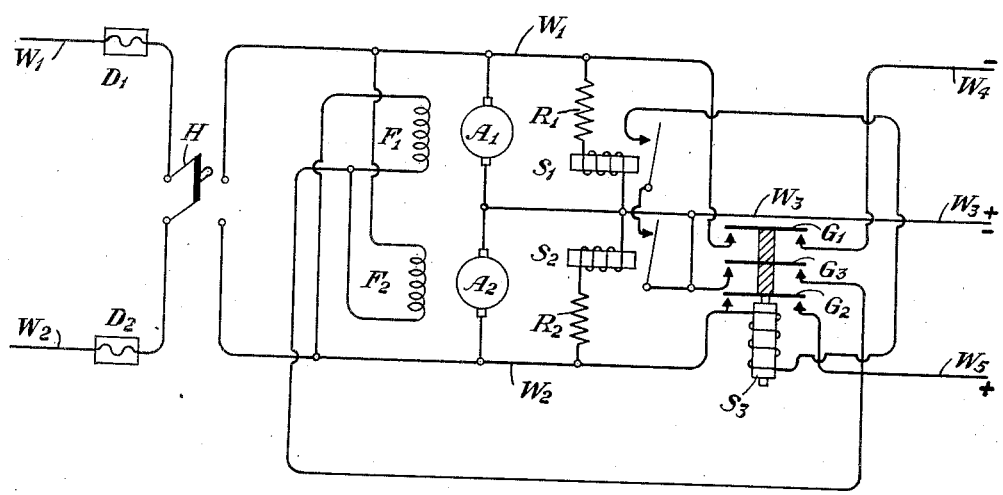
INVENTOR
O. H. Walton
BY William R. Ballard
ATTORNEY Patented July 15, 1941

2,249,099

UNITED STATES PATENT OFFICE 2,249,099

DIRECT CURRENT POWER SYSTEM

Otto Henry Walton, Elmhurst, Ill., assignor to American Telephone and Telegraph Company, a corporation of New York Application June 20, 1940, Serial No. 341,550

4 Claims. (Cl. 171—97)

This invention relates to direct current power systems and to systems for converting direct current power of one voltage to direct current power of a different voltage. This invention also relates to direct current power systems suitable for supplying power to telephone and like apparatus as, for example, teletypewriters.

Heretofore, equipment such as teletypewriters and the like, were supplied with 220 volt D. C. power by connecting the equipment to the power line by means of a potentiometer of large capacity. Although the potentiometer arrangement operated satisfactorily it was found to be objectionable, however, because of the considerable amount of heat generated by the current traversing the potentiometer resistance. Some other form of arrangement free from this objection was required to properly connect the power line to the equipment to be operated.

In accordance with this invention a special form of arrangement has been set up for converting 220 volt D. C. power supplied over a two-wire circuit to 110 volt D. C. power to be fed over a three-wire circuit. The arrangement consists of two mechanically coupled D. C. motors of identical characteristics (which may comprise a motor-generator set) so connected to the three-wire line that the load or equipment to be operated will be connected to the armatures of the mechanically coupled motors only after the armatures of these motors have reached something approaching their rated speed.

This invention will be better understood from the detailed description hereinafter following when read in connection with the accompanying drawing showing one embodiment of the invention merely for the purpose of illustration.

Referring to the drawing, the reference characters $W_1$ and $W_2$ comprise a two-wire D. C. power line which may be, for example, of 220 volts. The line $W_1$—$W_2$ is connected through two fuses $D_1$ and $D_2$ and a double-pole single-throw switch H to the armatures $A_1$ and $A_2$ of two mechanically coupled motors. Although these armatures are mechanically coupled, they are also connected in series relationship across the line $W_1$—$W_2$ as are also the field windings $F_1$ and $F_2$ of these two motors. It will be observed that the upper terminal of the armature $A_1$ is connected to the conductor $W_1$ while the latter conductor is connected to the field winding $F_2$ which controls the armature $A_2$, and that the lower terminal of the armature $A_2$ is connected to the conductor $W_2$ while the latter conductor is connected to the field winding $F_1$ which controls the armature $A_1$.

The terminal common to the armatures $A_1$ and $A_2$ is connected to the neutral conductor $W_3$ of a three-wire circuit $W_3$—$W_4$—$W_5$. A resistor $R_1$ and the winding of a relay $S_1$ are connected in series with each other across the conductors $W_1$ and $W_3$. A similar resistor $R_2$ and the winding of a similar relay $S_2$ are also connected in series with each other across the conductors $W_2$ and $W_3$. The conductor $W_1$ will be connected to one of the outer conductors $W_4$ of the three-wire circuit by the armature $G_1$ of a power relay $S_3$ when the latter relay is operated. Similarly, the conductor $W_2$ will be connected to the other outer conductor $W_5$ of the three-wire circuit by the armature $G_2$ of the relay $S_3$ when the latter relay is operated. In response to the operation of the relay $S_3$ the inner armature $G_3$ will connect the neutral conductor $W_3$ to the terminal common to the field windings $F_1$ and $F_2$. When this happens the field winding $F_1$ will be connected across the conductors $W_2$ and $W_3$ as well as across conductors $W_3$ and $W_5$ of the three-wire circuit, while the field winding $F_2$ will be connected across the conductors $W_1$ and $W_3$ as well as across conductors $W_3$ and $W_4$ of the three-wire circuit. A plurality of load devices, such as teletypewriters or the like, (not shown) may be connected across the three-wire circuit $W_3$—$W_4$—$W_5$, preferably in such a way as to distribute the load fairly evenly between the two pairs of conductors $W_3$—$W_4$ and $W_3$—$W_5$.

When the switch H is open the armatures $A_1$ and $A_2$ will, of course, be stationary and the relay $S_3$ (as well as relays $S_1$ and $S_2$) will be released. The load devices will be disconnected from the armatures $A_1$ and $A_2$.

One of the objects of this invention is to connect the load devices, above referred to, to the armatures $A_1$ and $A_2$ only after the armatures have reached a predetermined speed of rotation. The armatures $A_1$ and $A_2$ each have low impedances of, for example, 10 or less ohms when these armatures are not in rotation, and the resistors $R_1$ and $R_2$ may each have impedances of about 3800 ohms, while the windings of the relays $S_1$ and $S_2$ may each have impedances of approximately 35 ohms.

Upon the closure of the switch H the voltage supplied over the conductors $W_1$ and $W_2$ will cause current to flow through the field windings $F_1$ and $F_2$ which are in series relationship. The armatures $A_1$ and $A_2$ being of lesser impedance than the respective impedances of the resistor and relay winding combination in shunt therewith, will receive a substantial current from the source $W_1$—$W_2$ and hence, will start to rotate. The relays $S_1$ and $S_2$, however, will remain unoperated for a substantial interval of time. As the speed of rotation of the armatures $A_1$ and $A_2$ increases, more and more current will flow through the resistors $R_1$ and $R_2$ and through the corresponding windings of relays $S_1$ and $S_2$, and as these armatures approach their rated speeds the flow of current through the windings of relays $S_1$ and $S_2$ will be sufficiently great to cause these relays to operate. In response to the operation of both relays $S_1$ and $S_2$, and only after relays $S_1$ and $S_2$ have both operated, the relay $S_3$ will be operated, the current for which is supplied by the voltage built up across the armature $A_2$. This current flows over the circuit including the conductor $W_2$, the winding of relay $S_3$, the contact and armature of relay $S_1$, the contact and armature of relay $S_2$, and conductor $W_3$. Upon the operation of relay $S_3$ the armature $G_1$ will complete the circuit between the outer conductors $W_1$ and $W_4$ of one of the pairs of circuits of the three-wire circuit extending to the armature $A_1$, while the armature $G_2$ will complete the circuit between the other pair of conductors $W_2$ and $W_5$ of the other circuit of the three-wire system connected to the armature $A_2$.

It will be observed that the two circuits of the three-wire system to which the load elements (not shown) are connected will be supplied with power only after the armatures $A_1$ and $A_2$ have reached some predetermined speed of rotation. If the power supplied to conductors $W_1$ and $W_2$ is of 220 volts then the circuits $W_3$—$W_4$ and $W_3$—$W_5$ will each be supplied with D. C. power of about 110 volts. At the same time if the load is fairly evenly distributed between the two circuits of the three-wire system just referred to, there will be virtually no current in the neutral conductor $W_3$. Moreover, the operation of relay $S_3$ will connect the common terminal of these field windings to the neutral conductor $W_3$ thereby bridging the field winding $F_1$ across the conductors $W_3$ and $W_5$ and the field winding $F_2$ across the conductors $W_3$ and $W_4$, as already pointed out.

The currents traversing the field windings $F_1$ and $F_2$ will be substantially identical when the loads connected to the two circuits of the three-wire system are substantially the same. Because of the balanced relationship usually prevailing in this system, the motors which include the armatures $A_1$ and $A_2$ need not be of large capacity as will be readily understood by those skilled in the art. The relays $S_1$, $S_2$ and $S_3$ are all operated under normal conditions, that is, when the switch H is closed and armatures $A_1$ and $A_2$ are rotating at about their rated speed. The relay $S_3$ will be a power relay having a winding able to carry a large current, while the relays $S_1$ and $S_2$ are much smaller relays carrying only a very small current.

In the event that the load connected to one of the circuits, such as $W_3$—$W_5$ of the three-wire system, is increased to substantially exceed the load applied to the other circuit $W_3$—$W_4$ of the system, the increased load on the circuit $W_3$—$W_5$ will act to reduce the voltage across that circuit as compared to the voltage across the circuit $W_3$—$W_4$. The field winding $F_1$, which is connected across the $W_3$—$W_5$ circuit, will therefor receive a smaller current than is supplied to the field winding $F_2$ which is bridged across the circuit $W_3$—$W_4$ on which the load is unchanged. Consequently, the armature $A_1$ will tend to increase in speed. In that case the armature $A_1$ will act as a motor and the other armature $A_2$, coupled thereto, will act as a generator. With normal current flowing through the field winding $F_2$, the windings of armature $A_2$ will thus generate power to be supplied to sustain the increased load on the circuit $W_3$—$W_5$ and thus tend to compensate the increased load on this circuit.

Throughout the unbalanced condition there will be a flow of current through the neutral conductor $W_3$ equal to the load unbalance. This current will drop to zero when the loads are again equalized.

One of the features of this invention is that with a circuit of the type illustrated and described, the loads connected to the two circuits of the three-wire system may be very large compared to the rating of the balancer machines which need to be only large enough to supply the unbalance in power between the two circuits. If a motor generator set were used in place of the circuit shown and described, it would have to be large enough to carry the full load. The two motors used in the form of circuit of this invention here illustrated were ¼ H. P. each.

The circuit of this invention permits teletypewriter or like apparatus to be supplied with low voltage D. C. power from a higher voltage source without endangering the apparatus supplying the load and without creating any substantial hazard for the operators manipulating the apparatus. The center armature $G_3$ of the relay $S_3$ also provides the added feature of protection against excessive voltage reaching any of the conductors of the three-wire system in the event that some trouble should develop in the armature $A_1$—$A_2$ circuits as, for example, arises when one of the brushes of one of the armatures is removed or is open-circuited.

The resistors $R_1$ and $R_2$ may be considered as current limiting devices to restrict the current flowing through the respective windings of relays $S_1$ and $S_2$. They may be omitted, if desired, in which case the impedances of the relay windings would have to be correspondingly increased.

The voltages and other constants specified hereinabove are given merely for the sake of illustration and are not to be construed as limitations on the invention.

While this invention has been shown and described in certain particular arrangements merely for the purpose of illustration, it will be understood that the general principles of this invention may be applied to other and widely varied organizations without departing from the spirit of the invention and the scope of the appended claims.

What is claimed is:

1. The combination of a source of direct current power, two rotatable armatures mechanically coupled to each other and connected in series with each other across said source of power, the field windings of said armatures being connected in series relationship with each other across said source of power, two circuits connected as a three-wire line to said armatures the neutral of which is connected to the terminal common to said armatures, a plurality of loads which may be connected to said two circuits, voltage responsive means for connecting said loads to said two circuits, and means responsive to the rotation of said armatures at a predetermined speed to provide a sufficient voltage to operate said voltage responsive means to connect said loads to said two circuits.

2. The combination of a source of direct current power, a three-wire circuit for supplying power from said source to a load connected to said three-wire circuit, two similar rotatable armatures mechanically coupled with each other connected and in series relationship across said source of power, voltage responsive means for connecting said source of power to said three-wire circuit, and means responsive to a predetermined speed in said rotatable armatures for operating said voltage responsive means for supplying power from said source to said three-wire circuit, the neutral of said three-wire circuit being connected to the terminal common to said armatures.

3. The combination of a source of direct current power, two rotatable armatures mechanically coupled to each other and in series relationship across said source of power, the field windings of said armatures being connected in series relationship with each other across said source of power, two relays the windings of which are connected in circuits respectively across the two armatures, means responsive to a predetermined speed of rotation of said armatures to provide a sufficient voltage, for operating said relays, a three-wire circuit the neutral of which is connected to the terminal common to the two armatures, a third relay operated in response to the operation of the other two relays for connecting the other two wires of the three-wire circuit to the other terminals of said rotatable armatures, and means responsive to the operation of said third relay for connecting the field windings across the two circuits of the three-wire circuit, each field winding being connected across the circuit of the three-wire system which is connected to the other rotatable armature.

4. The combination of a source of power, first and second loaded circuits arranged as a three-wire circuit, first and second similar rotatable armatures mechanically coupled to each other and arranged in series relationship across the source of power, first and second field windings associated respectively with said first and second armatures and connected in series relationship across said source of power, first and second relays the windings of which respectively shunt first and second said rotatable armatures and means responsive to a predetermined rate of speed of said rotatable armatures to provide a sufficient voltage to operate said first and second relays, means responsive to the operation of both of said relays to connect the first and second loaded circuits to said rotatable armatures, the neutral of which will terminate at the point where the two rotatable armatures are connected together, said latter means including means to connect the first field winding across the second loaded circuit and the second field winding across the first loaded circuit.

OTTO H. WALTON.